(No Model.)
J. H. DOWNING.
COMBINED POKE AND MUZZLE.
No. 326,634. Patented Sept. 22, 1885.
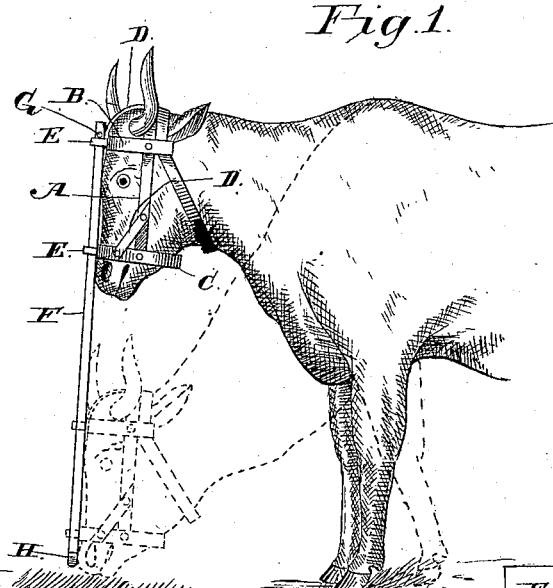
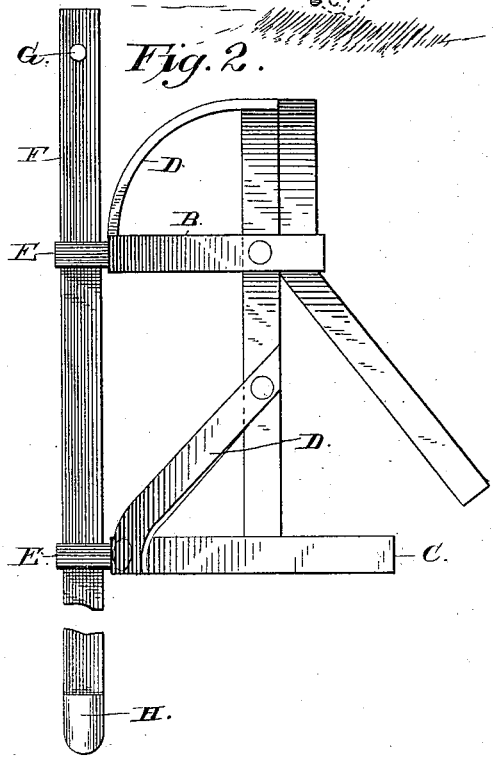
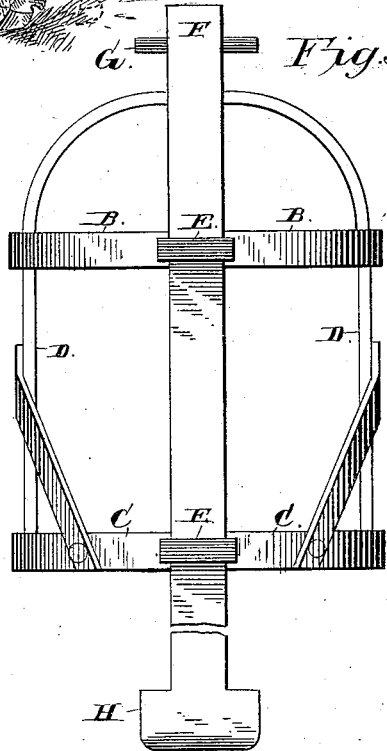
WITNESSES
INVENTOR
J. H. Downing
By his Attorneys

UNITED STATES PATENT OFFICE.

JAMES HENRY DOWNING, OF ABERDEEN, MISSISSIPPI.

COMBINED POKE AND MUZZLE.

SPECIFICATION forming part of Letters Patent No. 326,634, dated September 22, 1885.

Application filed June 13, 1885. (No model.)

*To all whom it may concern:*

Be it known that I, JAMES H. DOWNING, a citizen of the United States, residing at Aberdeen, in the county of Monroe and State of Mississippi, have invented a new and useful Improvement in Combined Poke and Muzzle, of which the following is a specification, reference being had to the accompanying drawings.

My invention relates to an improvement in combined pokes and muzzles; and it consists in the peculiar construction and combination of devices that will be more fully set forth hereinafter, and particularly pointed out in the claims.

In the accompanying drawings, Figure 1 is a side elevation of my invention applied to an animal. Fig. 2 is a like elevation separate from the animal, and Fig. 3 is a front elevation of the same.

A represents a headstall or halter, which may be of any preferred construction, having a brow-band, B, and a nose-band, C. Brace-straps D connect the nose-band and the brow-band with the head strap, and thereby firmly support said bands on the face of the animal and prevent them from sagging downwardly or turning edgewise and chafing the animal. Loops E are firmly attached to the center of the nose-band and brow-band, on the front sides thereof and directly in the center of the face of the animal. These loops should, preferably, be made of metal or other rigid material.

F represents a bar which slides vertically in the loops E, and which should be of a length sufficient to nearly reach the ground when the animal is standing with his head raised.

Through the upper end bar is passed a transverse pin, G, which bears against the upper side of the upper loop when the animal's head is raised, and thereby supports the bar and prevents it from slipping out of the loops, and the lower end of the bar has an enlarged head, H, the lower side of which is rounded, as shown, and adapted to work or slide freely over the ground among the grass when the animal is grazing, and thus offer no impediment to the movements of his head.

When the halter is put on the head of an animal, the bar F is suspended directly from the center of his face, and as it reaches nearly to the ground will effectually prevent him from jumping fences. Some animals have a propensity for forcing a passage through a rail fence by inserting the nose under the rails and throwing them down, one at a time, until a panel or more is leveled. By means of this invention it will be readily understood that the animal will be prevented from doing this, as it will be impossible for him to place his nose under a rail by reason of the depending bar F.

When the animal lowers his head to the ground, the loops E permit the halter to slide freely down the bar and thus offer no obstacle to his eating. My invention is also adapted to effectually prevent a young calf or colt from sucking its dam, as will be readily understood.

A combined yoke and muzzle thus constructed is extremely cheap and simple, is thoroughly practical and efficient, and does not distress or annoy the animal wearing it.

Having thus described my invention, I claim—

1. The combination, with a halter, of a vertically-sliding bar secured thereto, the upper end provided with a pin, and the lower end of said bar having a rounded head to permit the bar to work freely in the grass when the animal is grazing, substantially as described.

2. The combination, with a halter having the loops E, of a bar provided with a pin at one end and an enlarged head at the other end, suspended in the loops and adapted to slide vertically therein, substantially as described.

In testimony that I claim the foregoing as my own I have hereto affixed my signature in presence of two witnesses.

JAMES HENRY DOWNING.

Witnesses:
 GEORGE C. PAINE,
 R. R. DILLINGHAM.